United States Patent
Chung et al.

(10) Patent No.: US 7,303,609 B2
(45) Date of Patent: Dec. 4, 2007

(54) MANUFACTURE OF POLYIMIDE-HOLLOW FIBRES

(75) Inventors: Tai-Shung Chung, Singapore (SG); Rong Wang, Singapore (SG); Ji Zhong Ren, Singapore (SG); Chun Cao, Singapore (SG); Ye Liu, Singapore (SG); Dong-Fei Li, Singapore (SG)

(73) Assignee: British Gas Asia Pacific Pte Limited, Singapore (SG)

( * ) Notice: Subject to any disclaimer, the term of this patent is extended or adjusted under 35 U.S.C. 154(b) by 287 days.

(21) Appl. No.: 10/495,266

(22) PCT Filed: Nov. 8, 2002

(86) PCT No.: PCT/GB02/05065

§ 371 (c)(1),
(2), (4) Date: Nov. 15, 2004

(87) PCT Pub. No.: WO03/040444

PCT Pub. Date: May 15, 2003

(65) Prior Publication Data

US 2005/0069700 A1    Mar. 31, 2005

(30) Foreign Application Priority Data

Nov. 8, 2001    (GB) .................. 0126881.2

(51) Int. Cl.
  *B01D 53/22*    (2006.01)
  *D01D 5/24*    (2006.01)

(52) U.S. Cl. .................. 96/10; 96/8; 96/13; 96/14; 55/DIG. 5; 264/561; 264/563; 264/178 R; 264/209.1; 264/211.14; 210/500.23; 210/500.39

(58) Field of Classification Search .............. 96/8, 96/10, 11, 12, 13, 14; 95/45, 51, 54; 55/DIG. 5; 264/561, 562, 563, 41, 178 R, 209.1, 211.14; 428/364, 376, 395, 398; 210/500.21, 500.23, 210/500.27, 500.39, 490
See application file for complete search history.

(56) References Cited

U.S. PATENT DOCUMENTS

| | | | | |
|---|---|---|---|---|
| 5,085,774 A * | 2/1992 | Ekiner et al. | ............... | 96/10 |
| 5,232,472 A * | 8/1993 | Simmons et al. | ............... | 96/14 |
| 5,304,307 A * | 4/1994 | Linder et al. | ............... | 210/490 |
| 5,320,754 A * | 6/1994 | Kohn et al. | ............... | 210/490 |
| 5,413,852 A * | 5/1995 | Chung et al. | ............... | 428/364 |
| 5,429,748 A * | 7/1995 | White et al. | ............... | 210/500.39 |
| 5,599,380 A * | 2/1997 | Koros | ............... | 95/54 |
| 5,618,332 A * | 4/1997 | Ekiner et al. | ............... | 95/51 |
| 5,795,920 A * | 8/1998 | Kang et al. | ............... | 264/41 |
| 5,928,410 A * | 7/1999 | Jois et al. | ............... | 95/51 |
| 6,015,516 A * | 1/2000 | Chung et al. | ............... | 264/41 |

* cited by examiner

*Primary Examiner*—Jason M. Greene
(74) *Attorney, Agent, or Firm*—B. Aaron Schulman; Stites & Harbison PLLC

(57) ABSTRACT

A process for the manufacture of a polyimide hollow fibre comprising: (i) providing a dope solution comprising one or more polyimides dissolved in a solvent comprising 60-100 wt % N-methylpyrollidone and 0-40 wt % ethanol, (ii) providing a bore fluid, (iii) generating a tube of the dope solution filled with the bore fluid, (iv) bringing the product of step (iii) into contact with a coagulation solvent to form a hollow fiber.

18 Claims, 1 Drawing Sheet

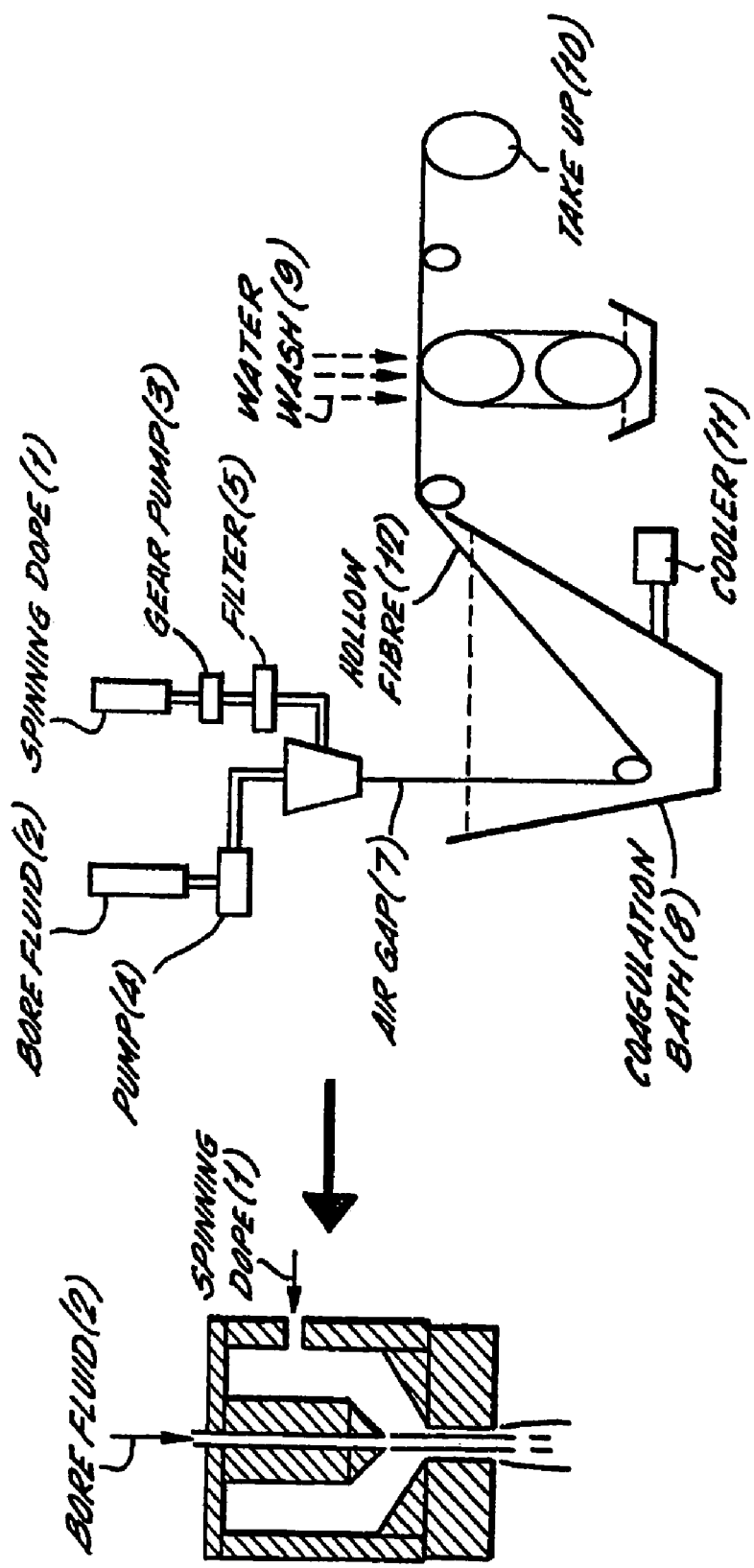

MANUFACTURE OF POLYIMIDE-HOLLOW FIBRES

BACKGROUND OF THE INVENTION

The present invention relates to a process for the manufacture of high performance polyimide hollow fibres. Specifically, the invention enables simple manufacture of high performance polyimide gas separation membranes using environmentally friendly solvents for the preparation of the dope solutions, bore fluids and coagulation solutions of hollow fibre manufacturing processes.

Polyimides are known to be useful for the manufacture of membrane materials. In particular, fluorinated polyimides containing 2,2'-bis(3,4-dicarboxyphenyl) hexafluoropropane dianhydride (6FDA) as a monomer component have been identified as promising membrane materials for their high gas permeability and selectivity due to their rigid primary structures with bulky $CF_3$ groups, which tend not only to inhibit efficient packing of polymer chains but also reduce local segmental mobility. For example, 6FDA-2,6-DAT polyimide (poly(2,6-toluene-2,2'-bis(3,4-dicarboxyphenyl) hexafluoropropane diimide), was reported to possess excellent intrinsic gas separation properties with a selectivity of $CO_2$ over $CH_4$ around 45. 6FDA-based polyimides also exhibit many other desirable properties such as spinnability, thermal and chemical stability and mechanical strength. These important properties make the commercial applications of these membranes for gas separation practical.

Asymmetric hollow fibres are one of the most preferred membrane morphologies for gas separation due to their high ratio of membrane surface area to volume. The ideal asymmetric hollow fibre membranes should consist of a defect-free ultra-thin skin layer supported by a porous substructure layer. But it is still a challenge to fabricate hollow fibre membranes with a completely defect-free ultra-thin dense skin layer due to the complexity of the formation mechanism and process of hollow fibre spinning.

In terms of preparing asymmetric hollow fibre membranes, it is important to choose an appropriate spinning system and proper spinning conditions. Usually, the spinning system is a ternary system with one polymer, one solvent and one non-solvent. However, a binary (one polymer and one solvent) system has proved workable for the preparation of hollow fibres. Thus, the addition of a non-solvent into spinning dopes is not a pre-condition to form ultrathin skin layer hollow fibre membranes.

U.S. Pat. No. 5,674,629 (to Institut Francais du Petrole) reports that hollow fiber membranes spun from a polyimide containing 6FDA-2,6-DAT using a 1,4-dioxane/N-methylpyrollidone(NMP) dope solvent have impressive properties. Pure gas tests conducted at 118 psi show a permeance of 162 GPU (1 GPU=$1\times10^{-6}$ $cm^3$ (STP)/$cm^2 \cdot s \cdot cmHg$) for $CO_2$ and a selectivity of 74 for $CO_2/CH_4$, whereas mixed gas tests at 368 psi exhibit a permeance of 155 GPU for $CO_2$ and a selectivity of 59 for $CO_2/CH_4$. However, the spinning system and conditions reported in this patent are unsuitable for scale-up. This is due to the following facts: (1) 6FDA-2,6DAT polyimide does not dissolve well in the solvent mixture 1,4-dioxane and NMP. Thus, it is not easy to prepare a fully dissolved solution. (2) The bore fluid is made up of a mixture of acetic acid, water and 1,4-dioxane. (3) The external coagulant comprises a 52 wt % acetic acid aqueous solution, which has to be maintained during the experiment. Acetic acid is a corrosive solvent, while 1,4-dioxane is a toxic solvent. Both are not desirable for fiber spinning on a large scale because of these properties.

It is an object of the present invention to develop a process for the manufacture of polyimide hollow fibers which avoids the use of inconvenient and environmentally unfriendly solvents but which maintains good levels of performance in the resultant fibers.

BRIEF SUMMARY OF THE INVENTION

Accordingly, the present invention provides a process for the manufacture of a polyimide hollow fiber comprising the steps of:
(i) providing a dope solution comprising one or more polyimides dissolved in a solvent comprising 60-100 wt % N-methyl-pyrollidone and 0-40 wt % ethanol,
(ii) providing a bore fluid,
(iii) generating a tube of the dope solution filled with the bore fluid,
(iv) bringing the product of step (iii) into contact with a coagulation solvent to form a hollow fiber.

It will be appreciated that steps (i) and (ii) need not be performed in any particular order and may indeed be performed simultaneously.

In the context of the present specification the term "tube" is not limited to tubes of circular cross-section but is intended to include tubes with any cross-sectional shape including, for example, square, rectangular or hexagonal cross-section. However, a circular cross-section is preferred.

In a preferred embodiment of the present invention, the solvent in step (i) comprises 60-95 wt % N-methylpyrollidone and 5-40 wt % ethanol. More preferably, the solvent in step (i) comprises 60-90 wt % N-methylpyrollidone and 10-40 wt % ethanol. Even more preferably, the solvent in step (i) comprises 70-90 wt % N-methylpyrollidone and 10-30 wt % ethanol.

In a preferred embodiment of the present invention, the bore fluid comprises 85-100 wt % N-methylpyrollidone and 0-15 wt % water. More preferably, the bore fluid comprises 90-100 wt % N-methylpyrollidone and 0-10 wt % water. Even more preferably, the bore fluid comprises 90-99 wt % N-methylpyrollidone and 1-10 wt % water. Most preferably, the bore fluid comprises 93-96 wt % N-methylpyrollidone and 4-7 wt % water.

In a preferred embodiment of the present invention, the coagulation solvent is water.

In a preferred embodiment of the present invention, the tube of the dope solution filled with the bore fluid is generated by a spinneret. Such a method of spinning hollow fibers is well know in the art and is reported in detail in "Formation of ultrathin high-performance polyethersulfone hollow fiber membranes" Chung et al., J. Membr. Sci. 133, (1997), 161.

BRIEF DESCRIPTION OF THE DRAWING

FIG. 1 is a schematic diagram of a hollow fiber spinning line.

DETAILED DESCRIPTION OF THE INVENTION

The method is summarized herein with reference to FIG. 1 which shows a schematic diagram of a hollow fiber spinning line. The dope solution or spinning dope (1) is fed into a spinneret (6) under the control of a gear pump (3) via a filter (5). The bore fluid (2) is fed into the spinneret (6)

under the control of a separate pump (4). Once the spinning dope and bore fluid meet at the tip of the spinneret (6) the nascent fiber formed passes through an air gap (7) wherein some of the solvent at the outer extremities of the fiber is evaporated in order to concentrate the dope solution in those regions. The nascent fiber then enters a coagulation bath (8) wherein the polymer precipitates to generate the solid hollow fiber (12). A cooler (11) may be used to control the temperature of the coagulation bath (8). The sold hollow fiber (12) is drawn out of the coagulation bath (8) by the take-up (10) and may be subjected to a water wash (9) on leaving the coagulation bath (8).

In a preferred embodiment, the temperature of the spinneret is controlled such that it remains in the range of from 25° C. to 80° C., more preferably from 60° C. to 75° C.

The process of the present invention is particularly suitable for the synthesis of polyimide hollow fibers wherein the one or more polyimides is/are selected from polyimides having the structure shown in Formula I below:

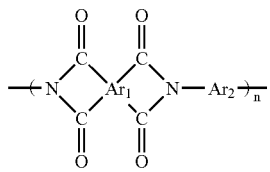

Formula I wherein n is sufficient to provide a viable polymer for a hollow fiber membrane, wherein each of the n $Ar_1$ groups is a quadrivalent organic group independently selected from the group consisting of:

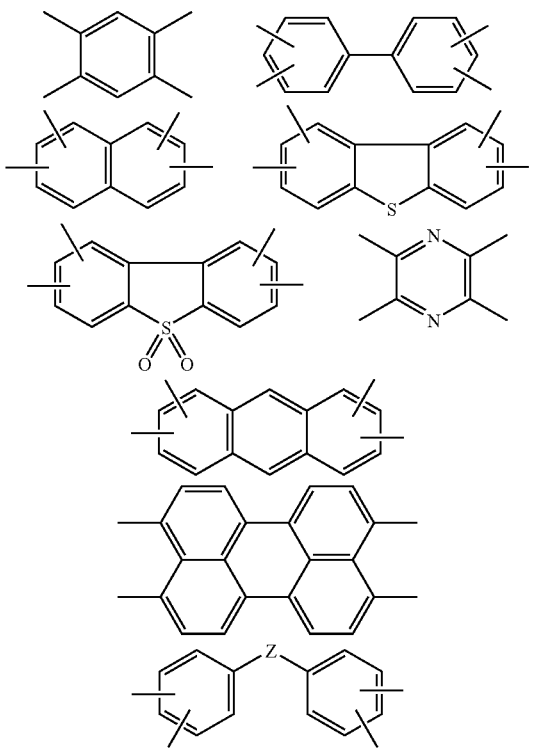

wherein each of the n $Ar_2$ groups is a divalent organic group independently selected from the group consisting of:

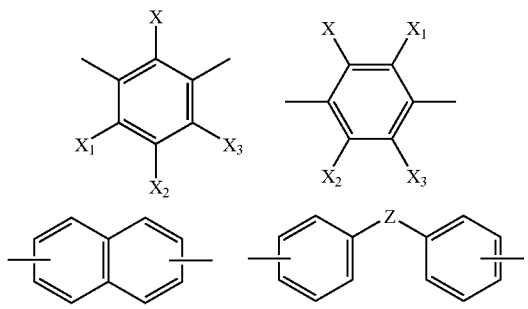

wherein Z is a divalent organic group selected from the group consisting of:

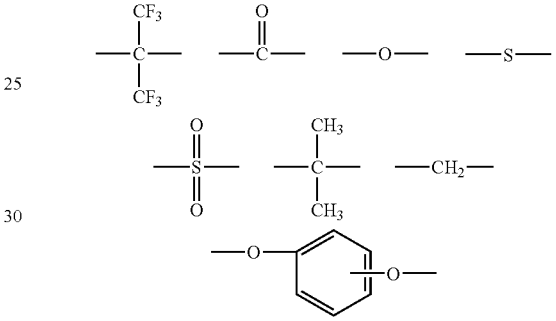

and X, $X_1$, $X_2$ and $X_3$ are each independently selected from the group consisting of: hydrogen, $C_{1-5}$alkyl, $C_{1-5}$alkoxy, phenyl or phenoxy groups.

Most preferably the process may be applied to the synthesis of a polyimide hollow fiber wherein the polyimide is of the general formula:

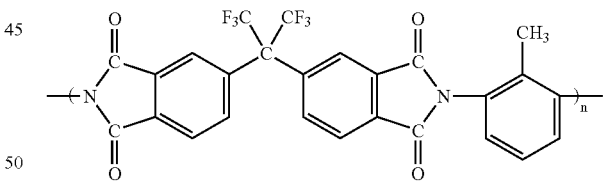

wherein n is sufficient to provide a viable polymer for a hollow fiber membrane.

In a preferred embodiment of the present invention, n is a number sufficient to provide a polymer with an inherent viscosity of at least 0.3 dL/g as measured at 25° C. on a 0.5% by weight solution in N-methylpyrrolidone.

In a preferred embodiment of the present invention the one or more polyimides is/are present in the dope solution provided by step (i) in an amount of from 15-40 wt %, more preferably in an amount of from 20-30 wt %.

In a preferred embodiment of the present invention, after generation in step (iii) but before being brought into contact with a coagulation solvent in step (iv), the tube of dope solution filled with bore fluid passes through an air gap.

Preferably the air gap is less than or equal to about 40 mm, more preferably in the range of from 6 to 10 mm.

Following synthesis of the hollow fiber it may be subjected to various other treatment steps. Thus, after step (iv) the hollow fiber may be washed with water and/or methanol and/or hexane and then dried in air and/or a vacuum oven. In a particularly preferred embodiment the post-treatment comprises storing the fibers in water, performing solvent exchange with methanol then hexane, drying in air then relocating to a vacuum oven for further drying. The most preferred post-treatment involves storing in water for three days followed by:

1. 3 times fresh methanol solvent exchange for 30 min each at room temperature.
2. 3 times fresh hexanes solvent exchange for 30 min each at room temperature.
3. Put the fibers in air, dry in the shade for 1 hr.
4. Then relocate to vacuum oven at 35° C. for 30 min, 45° C. for 30 min, 55° C. for 30 min, 65° C. for 30 min, 75° C. for 60 min or at elevated temperatures (i.e. about 120° C.) overnight.
5. Cooling down naturally.

In another embodiment, the present invention also provides a polyimide hollow fiber whenever produced by a process as hereinbefore described. The hollow fiber preferably has an outer diameter of from 50 µm to 5000 µm, more preferably from 100 µm to 1000 µm, and an inner diameter of from 25 µm to 4900 µm, more preferably from 25 µm to 900 µm The present invention will now be further described by way of the following examples.

EXAMPLES

Preparative Example 1

A stoichiometric amount of 2,2'-bis(3,4-carboxylphenyl) hexafluoropropane dianhydride (6FDA) was added to a solution of 2,6-diamino toluene (2,6-DAT) in N-methylpyrollidone (NMP) with stirring under argon at ambient temperature. 24 h later, a mixture of acetic anhydride and triethylamine (the molar ratio of acetic anhydride/triethylamine to 6FDA was 4:1) was slowly added to the solution to complete imidization for 24 h. The resultant polymer was slowly precipitated in methanol. After being filtered and washed with fresh methanol, the resultant polymer was dried at 150° C. under vacuum for 24 h. Its inherent viscosity was measured in NMP.

Example 1

Synthesis of 6FDA-2, 6DAT Composite Hollow Fiber Membranes

Dopes made from 28 wt % 6FDA-2,6-DAT (intrinsic viscosity (IV) in NMP of 0.66 dl/g) in NMP were employed as the spinning solutions. The bore fluid composition used was a 95:5 (by weight) mixture of NMP and water with a flow rate of 0.18 ml/min, while the fiber take-up speed was around 375 cm/min. Tap water at room temperature was used as the coagulant. The details of the dry-jet wet spinning conditions are listed in Table 1.

TABLE 1

| Dry-jet wet spinning conditions | |
| --- | --- |
| Dope solution | 28 wt % 6FDA-2,6DAT in NMP |
| Bore fluid | NMP/Water (95/5 wt/wt) |
| External coagulant | Tap Water (Room Temperature) |
| Spinneret dimension | Length of dope path at orifice (L) = 1.8 mm |
| | OD/ID = 0.8 mm/0.5 mm |
| Air gap (cm) | 3 |
| Spinning temperature (° C.) | 40.6 |
| Bore fluid (ml/min) | 0.18 |
| Take-up speed (cm/min) | 375 |

The procedure of post treatment of the fiber is described as follows:

1. Stored in water for 24 hours;
2. Washed in fresh methanol three times, half an hour each time;
3. Washed in fresh hexane three times, half an hour each time;
4. Dried in an oven at 75° C. for 3 hours, then slowly increasing the temperature to 120° C., and continually dried overnight.

After drying, the fibers were cut into lengths of 10-15 cm, and small test samples were made with 8-10 fibers. The fiber samples were mounted in a stainless steel module and coated with silicone rubber. The testing pressure was controlled from 20-200 psi and the gas testing sequence is in the order of $O_2$, $N_2$, $CH_4$ and $CO_2$. The gas permeation rate was determined by a digital bubble flow meter.

TABLE 2

Gas separation properties of silicon-coated hollow fibres spun from 6FDA-2,6-DAT

| 6FDA-2,6DAT Hollow Fibre Module | Testing System | Testing Conditions Temp | Upstream pressure | Permeance (GPU) | | | | Selectivities | | Annotation |
| --- | --- | --- | --- | --- | --- | --- | --- | --- | --- | --- |
| | | | | $O_2$ | $N_2$ | $CH_4$ | $CO_2$ | $O_2/N_2$ | $CO_2/CH_4$ | |
| Modules of Example 1 Fibre parameters: OD: 480 µm ID: 210 µm Apparent dense skin | Pure gases (Initial Time) | 23° C. | 200 Psi | 28.7 | 6.72 | 4.60 | 300 | 4.27 | 65 | Conditioning time: For $O_2$ & $N_2$: 0.25 hr |
| | Pure gases (After 185 days) | 23° C. | 200 Psi | 15.1 | 2.67 | 1.21 | 76 | 5.66 | 63 | For $CH_4$ & $CO_2$: 1.5 hr Testing sequence: $O_2$, $N_2$, $CH_4$, $CO_2$ |

TABLE 2-continued

Gas separation properties of silicon-coated hollow fibres spun from 6FDA-2,6-DAT

| 6FDA-2,6DAT Hollow Fibre Module | Testing System | Temp | Testing Conditions Upstream pressure | $O_2$ | $N_2$ | Permeance (GPU) $CH_4$ | $CO_2$ | $O_2/N_2$ | Selectivities $CO_2/CH_4$ | Annotation |
|---|---|---|---|---|---|---|---|---|---|---|
| thickness: 3937 Å* | Mixed gases | 18° C. | 200 Psi | | | 1.46 | 59 | | 40 | Conditioning time: 1.5 hr 40% $CO_2$ + 60% $CH_4$ (Mol %) |
| U.S. Pat. No. 5,674,629 | Pure gases | 20° C. | 118 Psi | | | 2.20 | 162 | | 74 | |
| | Mixed gases | 20° C. | 368 Psi | | | 2.63 | 155 | | 59 | 30% $CO_2$ + 70% $CH_4$ (Mol %) |

*calculation based on gas permeation properties of dense film: $O_2/N_2$ selectivity of 5.0 and permeability of 11.3 barrer at 35° C. and 2 atm Table 2 summarises the pure-gas and mixed-gas performances of 6FDA-2, 6DAT asymmetric composite hollow fiber membranes at various conditions. The initial permeance of $CO_2$ is 300 GPU (1 GPU=$1\times10^{-6}$ $cm^3$ (STP)/$cm^2$.s.cmHg) and the selectivity for $CO_2/CH_4$ is 65 at 200 psi, which is comparable with the reported data in U.S. Pat. No. 5,674,629 ($CO_2$ permeance of 162 GPU and $CO_2/CH_4$ selectivity of 74). This clearly demonstrates that these dope spinning system and process conditions can produce 6FDA-2, 6DAT asymmetric composite hollow fibers membranes with similar performance to those reported in U.S. Pat. No. 5,674,629.

After the hollow fibers experienced 185-day physical ageing and reached the equilibrium state, the mixed gas permeation tests were conducted. The $CO_2$ and $CH_4$ permeances are 59 GPU and 1.46 GPU, respectively, which correspond to $CO_2/CH_4$ selectivity of about 40. Even though the selectivity in the mixed gas system drops, the overall performance is still very impressive for the application of $CO_2/CH_4$ separation. In addition, since the reported $CO_2/CH_4$ selectivity from the dense 6FDA-2, 6-DAT membrane was about 45-46 at 35° C., it strongly suggests that the $CO_2/CH_4$ selectivity value obtained from the current mixed gas tests is more consistent (and reliable) with the literature values than that reported in U.S. Pat. No. 5,674,629.

Example 2

6FDA-2, 6-DAT Hollow Fiber Membranes (without Silicone Rubber Coating)

150 g 6FDA-2, 6 DAT polyimide (IV=0.61 dl/g) was dried in a 120° C. vacuum oven for 48 hr. After natural cooling to room temperature, the above polyimide was put into a one-litre round-bottom flask. 367.2 g of N-methyl-2-pyrrolidone (from Merck Schuchardt, Purity/99%, used as received) was poured into the flask. The above mixture (29% polyimide in NMP) was stirred using a mechanical stirring system (50 rpm) under a nitrogen atmosphere (200 ml/min) for 72 hr to form the spinning dope. The viscosity of the spinning dope was 130 Pa.s under the share rate of 10 m.s$^{-1}$. The spinning dope was poured into a 1-litre stainless steel spinning tank. Degassing was carried out under vacuum for 24 hr (the vacuum was applied for 1 hr, then the vacuum valve was turned off and the tank was kept under vacuum status for 24 hr). 10 atm nitrogen was fed into the tank as the back-pressure. A 0.066 ml/rev gear pump was employed to drive the spinning dope to a spinneret. A 15 μm online filter was used to avoid spinneret blocking caused by particles. A spinneret with OD/ID=0.8 mm/0.5 mm was used for spinning (the length of dope path at the orifice was 1.8 mm). 95% NMP in water was employed as the bore fluid, which was delivered by a syringe pump. The air gap distance between the spinneret and coagulant was 5 mm. The spinneret temperature was set at 70° C. The dope delivery rate was 0.33 ml/min while bore fluid delivery rate was 0.1 ml/min, the fiber take-up velocity was 2.18 m/min. A defect-free hollow fiber with OD/ID=355/173 μm was formed. The spinning condition was summarized in Table 3.

TABLE 3

Spinning conditions of the preparation of defect free hollow fibres spun from 6FDA-2,6-DAT

| | |
|---|---|
| Spinning Dope Solution | 29 wt % 6FDA-2,6DAT (IV: 0.61 dl/g) in NMP |
| Spinning Dope Temperature | 70° C. |
| Air Gap | 0.5 cm |
| Spinning Dimension | L = 1.8 mm, OD/ID = 0.8 mm/0.5 mm |
| Bore Fluid | NMP/Water (95/5) |
| Bore Temperature | 70° C. |
| External Coagulant Bath | Tap Water |
| External Coagulant Temperature | Room Temperature |

The as-spun hollow fibers were kept in water for 3 days. Then the fibers were moved to solvent exchange. The procedure of solvent exchange is described below:

1) 3 times fresh methanol solvent exchange for 30 min each at room temperature.
2) 3 times fresh hexanes solvent exchange for 30 min each at room temperature.
3) Put the fibers in air, dry in the shade for 1 hr.
4) Relocate to a vacuum oven, 35° C. 30 min, 45° C. 30 min, 55° C. 30 min 65° C. 30 min, 75° C. 60 min.
5) Cool down naturally.

1054 pieces of fiber were assembled into a stainless steel shell of ID=18 mm to form a module with a 0.6 m effective separation length. The module specifications are listed in Table 4.

TABLE 4

Specification of modules prepared from defect free hollow fibres spun from 6FDA-2,6DAT

| | |
|---|---|
| Type | Bundle removable module |
| Module ID | 18 mm |
| Effective length | 30 cm |
| Fibre number | 1054 piece |
| Fibre OD | 0.0355 cm |
| Fibre ID | 0.0173 cm |
| Effective area | 3526 cm$^2$ |
| Packing density | 41% |
| Coating conditions | Uncoated |

The module was tested by mixing gas of 40% carbon dioxide in methane. The mixed gas testing results are listed in Table 5.

TABLE 5

Mixed gas separation properties of defect free hollow fibres spun from 6FDA-2,6-DAT Performance of the Module (mixing gas; 40% $CO_2$ and 60% $CH_4$)

| | Pressure (psi) | Composition (%) | Flux (ml/s) | $CO_2$ Permeance (GPU) | Selectivity ($CO_2/CH_4$) |
|---|---|---|---|---|---|
| Feed stream | 105 | 39.8 | 194.6 | | |
| Retentate stream | 105 | 14.8 | 125.3 | 179 | 30 |
| Permeant stream | 0 | 85 | 69.3 | | |

1 GPU = 1 × 10$^{-6}$ cm$^3$(STP)/cm$^2$ · s · cmHg

Example 3

Defect Free 6FDA-2, 6DAT Hollow Fiber Membranes

The spinning dope was prepared by dissolving 6FDA-2, 6-DAT polyimide (IV of 0.61 dl/g in NMP), in a mixed solvent comprising NMP and ethanol (EtOH) as a non-solvent. The spinning conditions were as listed in Table 6.

TABLE 6

Spinning conditions for the dope solution using NMP/ethanol as the solvent

| | |
|---|---|
| Spinning dope solution | 27 wt % 6TDA-2,6DAT Solvent (NMP/EtOH: 85/15, w/w) |
| Spinning dope temperature | 25° C. |
| Air gap | 0.5 cm |
| Spinning dimension | L = 1.8 mm, OD/ID = 0.8 mm/0.5 mm |
| Bore fluid | NMP/Water (95/5) |
| Bore temperature | 25° C. |
| External coagulant bath | Tap Water |
| External coagulant temperature | Room Temperature |

The as-spun fibers have OD of 360 μm and ID of 190 μm. The results of pure gas test for $O_2$, $N_2$, $CO_2$ and $CH_4$ of these hollow fiber membranes at 100 psi are shown in Table 7. The hollow fiber membranes prepared are defect free and have selectivities close to that of dense 6FDA-2, 6-DAT polyimide membranes.

TABLE 7

Gas separation properties of hollow fibres prepared from 6FDA-2,6-DAT/NMP/ethanol syntem

| Module (ID) | $CH_4$ Permeance (GPU) | $CO_2$ Permeance (GPU) | $CO_2/CH_4$ Selectivity | $O_2$ Permeance (GPU) | $N_2$ Permeance (GPU) | $O_2/N_2$ Selectivity |
|---|---|---|---|---|---|---|
| A | 2.90 | 125.72 | 43.38 | 24.6 | 5.2 | 4.8 |
| B | 2.21 | 121.71 | 55.07 | 22.5 | 4.5 | 5.0 |
| C | 1.98 | 108.41 | 54.85 | 19.5 | 4.0 | 4.9 |

1 GPU = 1 × 10$^{-6}$ cm$^3$(STP)/cm$^2$-s-cmHg

The invention claimed is:

1. A process for the manufacture of a polyimide hollow fiber comprising:
    (i) providing a dope solution comprising one or more polyimides dissolved in a solvent comprising 60-95 wt % N-methylpyrollidone and 5-40 wt % ethanol,
    (ii) providing a bore fluid,
    (iii) generating a tube of the dope solution filled with the bore fluid,
    (iv) bringing the product of step (iii) into contact with a coagulation solvent to form a hollow fiber.

2. A process as claimed in claim 1 wherein the solvent in step (i) comprises 60-90 wt % N-methylpyrollidone and 10-40 wt % ethanol.

3. A process as claimed in claim 1 wherein the solvent in step (i) comprises 70-90 wt % N-methylpyrollidone and 10-30 wt % ethanol.

4. A process as claimed in claim 1 wherein the bore fluid comprises 85-100 wt % N-methylpyrollidone and 0-15 wt % water.

5. A process as claimed in claim 1 wherein the bore fluid comprises 90-100 wt % N-methylpyrollidone and 0-10 wt % water.

6. A process as claimed in claim 1 wherein the bore fluid comprises 90-99 wt % N-methylpyrollidone and 1-10 wt % water.

7. A process as claimed in claim 1 wherein the bore fluid comprises 93-96 wt % N-methylpyrollidone and 4-7 wt % water.

8. A process as claimed in claim 1 wherein the coagulation solvent is water.

9. A process as claimed in claim 1 wherein the tube of dope solution filled with bore fluid is generated by a spinneret.

10. A process as claimed in claim 9 wherein the temperature of the spinneret is controlled between 25° C. and 80° C.

11. A process as claimed in claim 9 wherein the temperature of the spinneret is controlled between 60° C. and 75° C.

12. A process as claimed in claim 1 wherein the one or more polyimides is/are selected from polyimides having the structure shown in Formula I:

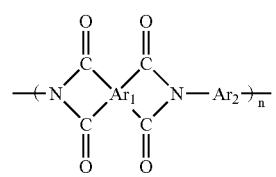

Formula I wherein n is sufficient to provide a viable polymer for a hollow fiber membrane, wherein each of the n $Ar_1$ groups is a quadrivalent organic group independently selected from the group consisting of:

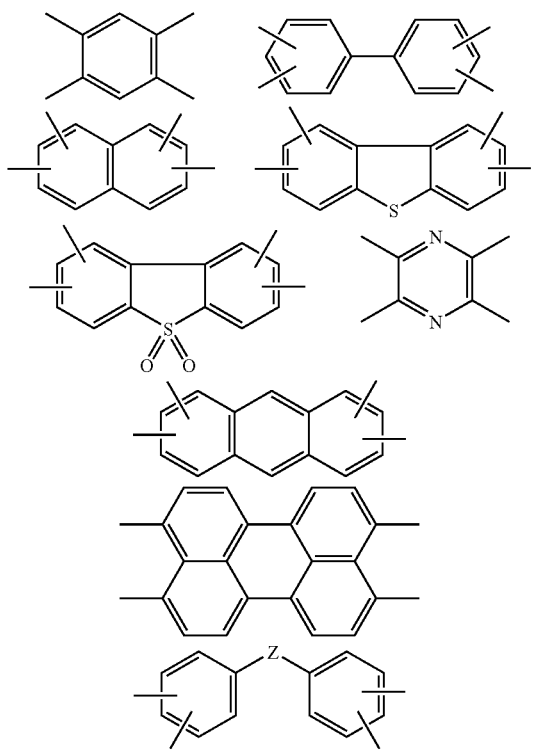

wherein each of the n Ar$_2$ groups is a divalent organic group independently selected from the group consisting of:

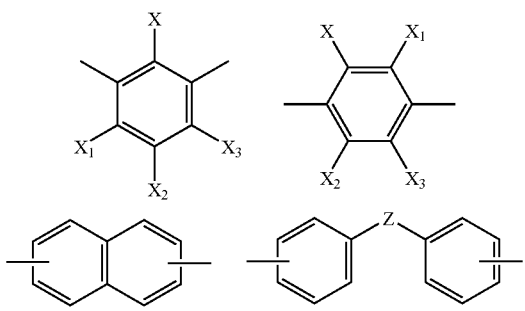

wherein Z is a divalent organic group selected from the group consisting of

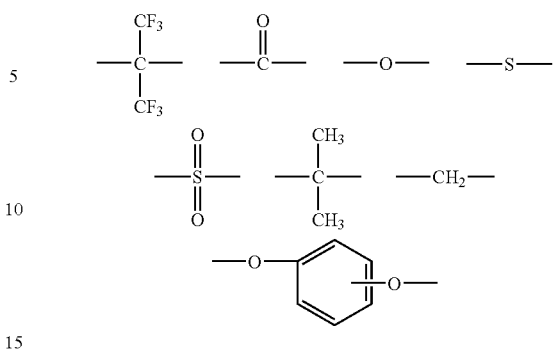

and X, X$_1$, X$_2$ and X$_3$ are each independently selected from the group consisting of:
  hydrogen, C$_{1-5}$alkyl, C$_{1-5}$alkoxy, phenyl or phenoxy groups.

13. A process as claimed in claim 12 wherein the polyimide is of the general formula:

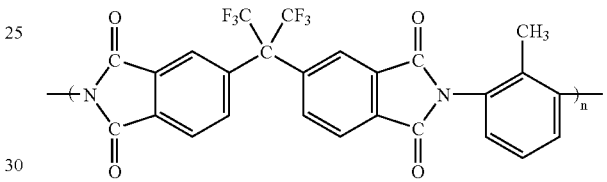

wherein n is sufficient to provide a viable polymer for a hollow fiber membrane.

14. A process as claimed in claim 1 wherein the one or more polyimides is/are present in the dope solution provided by step (i) in an amount of from 15-40 wt %.

15. A process as claimed in claim 1 wherein the one or more polyimides is/are present in the dope solution provided by step (i) in an amount of from 20-30 wt %.

16. A process as claimed in claim 1 wherein, after generation in step (iii) but before being brought into contact with a coagulation solvent in step (iv), the tube of dope solution filled with bore fluid passes through an air gap.

17. A process as claimed in claim 1 wherein, after step (iv) the hollow fiber is washed with water and/or methanol and/or hexane and then dried in air and/or a vacuum oven.

18. A polyimide hollow fiber produced by a process as claimed in claim 1.

* * * * *